(No Model.)
C. SEYBOLD.
SIGNATURE PRESS.
No. 514,872. Patented Feb. 13, 1894.
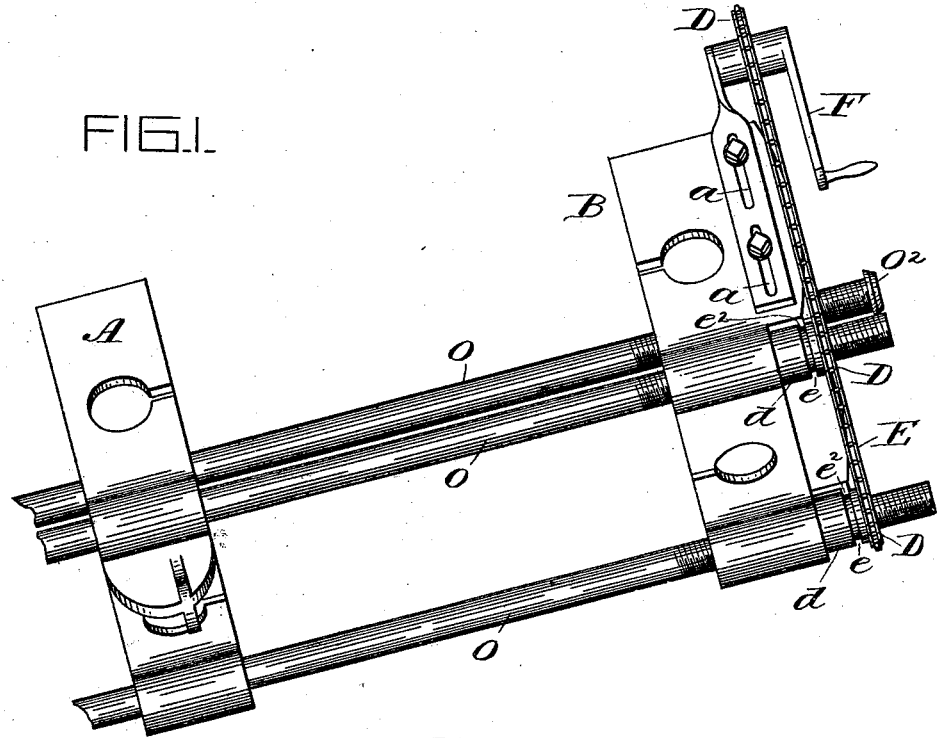
FIG.1.
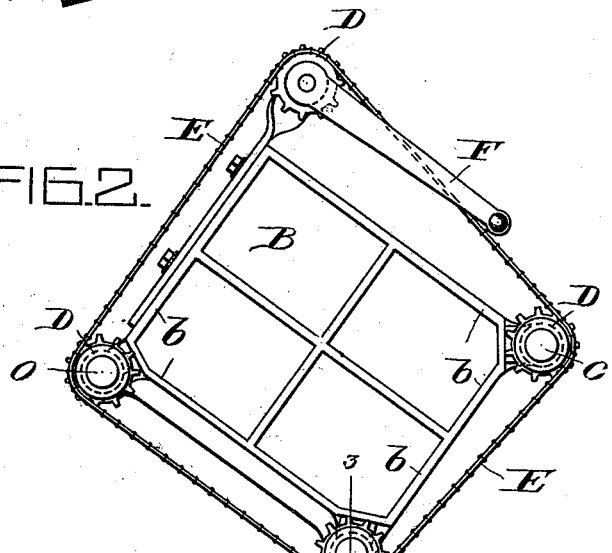
FIG.2.
Witnesses:
W. C. Jirdinston.
Harry F. F. King.
FIG.3.
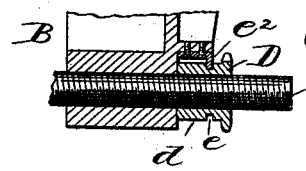
Inventor:
Charles Seybold
per O. M. Hill
Attorney.

UNITED STATES PATENT OFFICE.

CHARLES SEYBOLD, OF DAYTON, OHIO, ASSIGNOR TO THE SEYBOLD MACHINE COMPANY, OF SAME PLACE.

SIGNATURE-PRESS.

SPECIFICATION forming part of Letters Patent No. 514,872, dated February 13, 1894.

Application filed April 24, 1893. Serial No. 471,532. (No model.)

*To all whom it may concern:*

Be it known that I, CHARLES SEYBOLD, a citizen of the United States, residing at Dayton, Montgomery county, State of Ohio, have invented certain new and useful Improvements in Signature-Presses, of which the following is a specification, reference being had to the accompanying drawings.

The object and nature of my invention will be apparent from the detailed description and claims hereinafter set forth.

In the accompanying drawings:—Figure 1, is a side elevation of the two heads of a press, and supporting rods for same, showing my improved attachments connected to the outer head in an operative position. Fig. 2, is an end view of the head shown at right hand in Fig. 1, and attachment for adjusting same on its supporting rods. Fig. 3, is a detail sectional view showing one and the preferred mode of connection between the sprocket wheels and the head, shown in Fig. 2 and at right hand in Fig. 1.

In all presses, so far as I am aware, it has been customary to build them with one movable head and an outer stationary non-adjustable head, the material to be compressed being inserted between said heads.

My invention is more especially designed as an improvement over and an attachment for a signature press for book-binder's use, as shown, described and claimed in Letters Patent No. 471,303, dated March 22, 1893. In said patent I have shown a movable head A, supported upon the rods O, similar to that shown herein in Fig. 1; but, I do not herein limit myself to any specific form of mechanism for operating the head, A, as said movable head is old and constitutes no feature of my present invention, the same being illustrated only for the purpose of more clearly defining my improvements.

My invention consists in mounting the outer head, B, upon its supporting rods, O, in an adjustable manner; and, with this object in view, I prefer to form the outer end portion of said rods screw-threaded, said head being adapted to slide over said portion in the act of adjustment.

The head, B, is preferably provided with the face ribs, b, to one of which is connected the bracket-bearing, C, upon which is mounted one of the sprocket-wheels, D, as shown. This bracket is preferably provided with the elongated openings, a, in order to provide for adjusting said bracket, for the purpose hereinafter set forth.

Each of the rods, O, is provided with a sprocket-wheel, D, having a screw-threaded sleeve, d, attached thereto, which latter with its sprocket-wheel is adapted to travel back and forth over the screw-threaded portion of its rod, in the manner presently to be described. The sleeves, d, which travel upon the rods, O, are each provided with a peripheral groove, e, within which the flange, $e^3$, engages, the latter being rigidly connected to the head, as shown.

An endless chain-band, E, engages with the sprocket-wheels, D, to one of which is connected a crank, F, as shown, for imparting a rotary movement to said wheel which movement is communicated to the other wheels D, and their respective sleeves, d, through the medium of band, E. The rotation of crank F, through the medium of sprocket-wheels D, band E, sleeves d and flanges $e^2$ engaging in the peripheral grooves in said sleeves, causes the head, B, to travel back and forth on its supporting rods.

It is preferred to provide one or more of the rods, O, with an end cap, $O^2$, or other suitable means to prevent rotating the sprocket-wheels from off said rods.

The primary advantage attained by the use of my invention is the facility afforded thereby for accommodating a few sheets of printed signatures. Heretofore it has been necessary, when compressing a thin bundle of signatures, to provide boards or blocks to fill in part the space in order to get the benefit of the full pressure of the movable head; this objectionable feature is removed by means of my invention, as the outer head can be readily adjusted on its supporting rods in a moment's time.

While the specific means shown for adjusting the outer head is preferred, I do not limit myself to said means.

What I claim as new, and desire to secure by Letters Patent, is—

1. In a signature press, the head A mounted upon rods O in a sliding position, the outer end portion of said rods being screw-threaded, in combination with head B mounted upon said rods, said head having flanges $e^2$, sleeves $d$ mounted upon the screw-threaded portion of said rods, each of said sleeves having a peripheral groove within which the respective flange $e^2$ of the head engages, and suitable means for rotating said sleeves and for moving the head A, for the purposes specified.

2. The head, B, mounted upon supporting rods, O, the latter at their outer end portion being screw-threaded, in combination with sprocket-wheels D each having a threaded sleeve $d$ with a peripheral groove, $e$, endless chain E mounted upon said sprocket-wheels, flanges $e^2$ rigidly attached to said head and resting within the grooves $e$, and suitable means for rotating said sprocket wheels, substantially as set forth.

CHARLES SEYBOLD.

Witnesses:
FRED BRADMILLER,
W. H. EDWARDS.